Apr. 24, 1923.

P. R. LYDING

POULTRY HOUSE

Filed Oct. 19, 1920 3 Sheets-Sheet 1

1,452,746

INVENTOR.
Peter R. Lyding
BY Chas. E. Townsend
ATTORNEY

Apr. 24, 1923. 1,452,746
P. R. LYDING
POULTRY HOUSE
Filed Oct. 19, 1920 3 Sheets-Sheet 2

INVENTOR.
Peter R. Lyding
BY
ATTORNEY

Apr. 24, 1923.
P. R. LYDING
POULTRY HOUSE
Filed Oct. 19, 1920      3 Sheets—Sheet 3
1,452,746
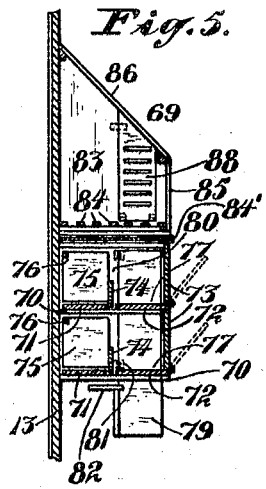
Fig. 5.
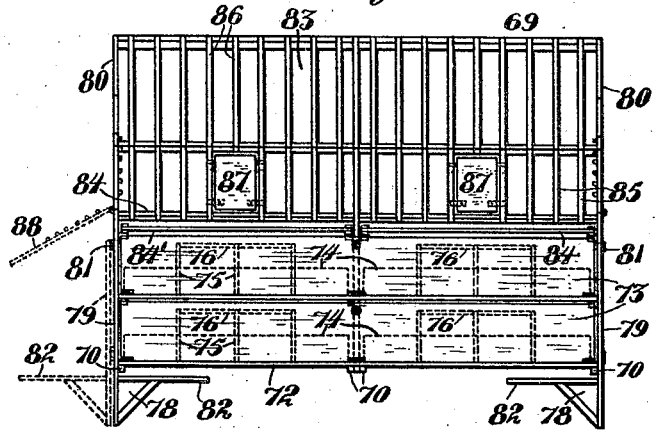
Fig. 6.
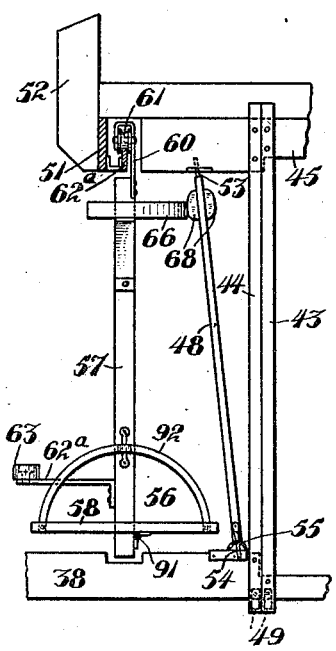
Fig. 7.
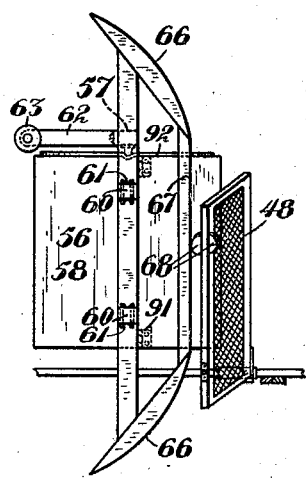
Fig. 8.
Fig. 9.
Fig. 10.
INVENTOR.
Peter R. Lyding
BY Chas E Inward
ATTORNEY Patented Apr. 24, 1923.

1,452,746

UNITED STATES PATENT OFFICE.

PETER R. LYDING, OF SACRAMENTO, CALIFORNIA.

POULTRY HOUSE.

Application filed October 19, 1920. Serial No. 418,042.

*To all whom it may concern:*

Be it known that PETER R. LYDING, citizen of the United States, residing at Sacramento, in the county of Sacramento and State of California, has invented new and useful Improvements in Poultry Houses, of which the following is a specification.

This invention relates to a poultry house.

It is the principal object of the present invention to provide a poultry house embodying structural features whereby the raising of poultry may be facilitated, and large numbers of chickens fed and otherwise cared for in a simple and convenient manner, at the same time insuring that the poultry will be maintained in an environment which will keep them contented and healthy, and in a desirable laying condition.

The present invention contemplates the use of a poultry house having a shed roof, within which are housed roosts, laying nests, compartments into which setting hens may be placed, means whereby the hens may be readily fed, and the nests and roosts easily cleaned, and at the same time affording movable and removable partitions by which the hen house may be divided into compartments of proper size to accommodate any desired number of chickens.

The invention is illustrated by way of example by the accompanying drawings, in which:

Fig. 5 is a view in section and elevation showing the nest construction.

Fig. 6 is a view in elevation showing the arrangement of the nests and the jail thereabove.

Fig. 7 is an enlarged view showing the car adjusted to travel throughout the length of the poultry house.

Fig. 8 is a view in plan showing the car and the manner in which a partition door is opened and closed thereby.

Fig. 9 is an enlarged fragmental view showing the construction of the self closing door.

Fig. 10 is a view in transverse section through the parts of Fig. 9, as indicated on the lines 10—10.

Figure 4:
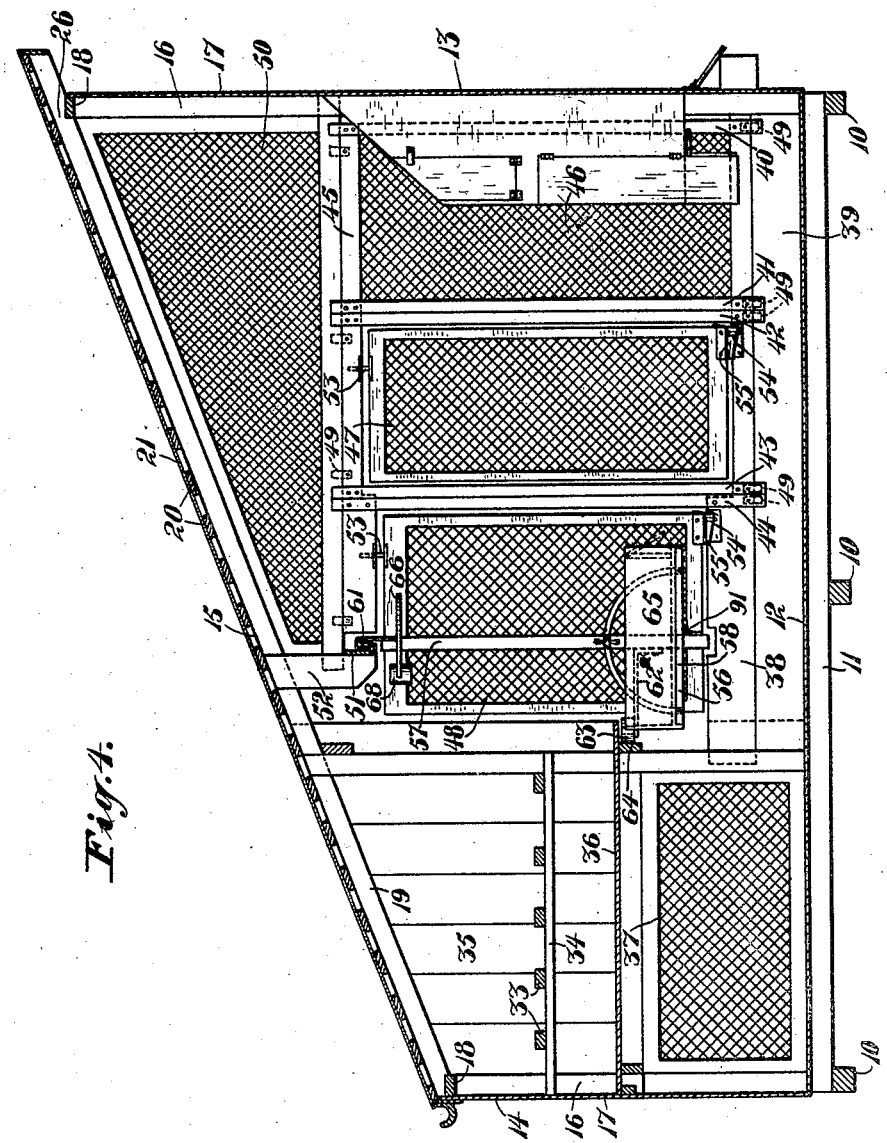
Fig. 4 is an enlarged view in transverse section through the poultry house.

Referring more particularly to the drawings, 10 indicates a plurality of longitudinal stringers resting upon the ground, and supporting transverse floor sills, 11. These sills carry a board floor 12, which extends the full length of the poultry house, and as clearly shown in Fig. 4, is supported a desirable distance above the ground, thus insuring that the floor of the house will at all times be dry, and that the house will be proof against rats and the like, due to the elevation of the floor, and the fact that rats will not nest in the unobstructed space therebeneath. Directly along one longitudinal edge of the floor is a front wall 13, while along the opposite partition edge is a rear wall 14. It is to be noted that these walls are of different heights, and that they support an inclining roof structure 15. The walls are suitably made of studding 16, covered by sheeting 17, sills 18 are secured across the upper ends of the studding and support the roof joists 19. These joists carry spaced sheeting 20, upon which a roof covering 21 is placed. The opposite ends of the building are enclosed with suitable sheeted walls, it being understood that the building may be of any desired length, and that in order to extend the length of the building it is only necessary to project the side walls, the floor and the roof, while again using the original end wall. Due to this simple construction it is thus possible to increase the capacity of the poultry house at will.

Distributed equidistant throughout the length of the house, and along the front wall 13 are windows 22. These windows are normally closed by glazed window sash 23, and are mounted to slide vertically. In order to facilitate in the ventilation each of the windows is equipped with a supporting cord 24, led upwardly over a roller 25, and secured to an operating cord 26, which cord is carried the full length of the poultry house, and is secured to a winding drum 27, thus making it possible to simultaneously raise or lower all the windows by rotation of the drum. A plurality of separately moving windows 28 are mounted in the back wall of the house, while fixed windows 29 are also provided and distributed throughout the length of the back wall, thus giving some light to the roost section of the house.

Ventilation is provided by allowing for an inflow of air through the lower run-way openings 29′, and the windows, and an outflow through the upper ventilators 30, and the normally opened spaces 31 between the roof and the top of the walls. The ventilators 30 may be opened or closed as the seasons require by doors 32. In building these houses it is common practice to locate them with their front walls 13 facing the east, thus exposing the inclined roof and the back walls 14 to the more intense rays of the sun throughout the day. This arrangement produces a circulation of air through the house, and caused the heating air to be expelled along the east side of the house, as the sun's ray strike the opposite side. The arrangement of the roof structure also insures that the heated air will be sufficiently raised above the roosts and the nests, while insuring that the atmosphere within the hen house will be maintained at a suitable temperature, and will, at the same time make it possible for the poultry to receive fresh air continuously.

Extending longitudinally of the poultry house, and along the wall 14, are roosts 33. These roosts are supported on timbers 34, and are interrupted at points throughout their length by partition walls 35. These walls extend across the house substantially the width occupied by the roosts and are preferably disposed between the pairs of windows 22. This structure will provide a rigid bracing for the roof and the house at intervals throughout its length, while at the same time preventing a draft across the roosts which would be objectionable to the chickens. Disposed a suitable distance beneath the roosts is a cleaning floor 36. It is to be noted that this floor is of a height such as to make it readily accessible to a workman without stooping over, and thus making it possible for such a person to more easily clean the roosts and the floor therebeneath. The portion of the partitions 35 beneath the floor 36 is fitted with screens 37 for ventilation purposes.

By referring to Fig. 4 it will be seen that the permanent partitions 35 extend about one-third of the distance across the poultry house, and that the remaining space is closed by a screen partition structure. This screen structure is removable, and comprises a cross sill 38, which rests upon a transverse partition board 39. This cross sill carries a series of up-rights 40, 41, 42, 43 and 44, which up-rights are nailed in place to the sill, and to a head board 45, thus combining with the boards 38 and 45 to form three rectangular spaces, one space covered with screening fabric 46, another space for receiving a swinging door 47, and a third space adjacent the fixed partition for receiving a secondary swinging door 48. The up-rights are all designed to over-lap the upper edge of the member 39, and are fitted with members 49, which may be brought down to over-lap the opposite side of the member 39 and prevent lateral movement of the partition structure relative thereto. The upper ends of these members are simply equipped to become inter-locked with a gable frame 50, which rests upon the top of the partition frame, and also hangs near the smaller end upon a longitudinal track stringer 51. This stringer is suspended from hangers 52. Due to this knock-down arrangement of the partitions it is possible to quickly position the same within the poultry house, or remove it when desired, inasmuch as it makes it possible to rapidly accommodate any number of hens, and to easily cull the hens without commotion and without transporting the poultry from one chicken house to the other with the result that the hens are frightened and otherwise harmed, so that laying will be materially retarded.

The doors 47 and 48 are designed to close automatically, and are preferably equipped with a special hinge more fully disclosed in my co-pending application, entitled "Hinge" filed concurrently herewith, and bearing Serial Number 418,043.

As shown in Figs. 7, 9 and 10 inclusive, these doors are fitted with upper pivots 53, which are offset from the edge of the door while they are provided with pivot pins 54 at their lower ends and along the edge of the door. The lower edge of the door is also fitted with a structure 55, by which the doors will slide closed when released. The door 47 is closed and allows ready access to the compartments on either side thereof. The door 48 is designed to be opened in a manner to accommodate a car 56. This car may be used for several purposes; to carry the feed throughout the length of the poultry house; to receive the droppings carried from the roost floor 36, and to carry a container for receiving the eggs gathered in various compartments of the hen house. The car comprises a vertical member 57, which is secured to a platform 58 at its lower end, and to a hanger 60 at the upper end. The hangers are bent over to form bearings for groove track pulleys 61, moving along a track 62. The track is secured parallel to the stringer 51, and supported thereby. Extending outwardly from the post 57 is a guide bar 62$^a$, which carries a roller 63 constantly bearing against a guide track 64. This track is secured longitudinally of the poultry house along the forward edges of the various sized partitions 35, and directly beneath the over-hanging ledge of the floor 36. It is to be noted that when a box 65 is mounted upon the platform 58 of the car, its upper edge will extend beneath the ledge of the floor 36, and thus permit material to be scraped from the floor directly into the box without danger of spilling or requiring that the operator bend over in elevating the material into the box. Adjacent the upper end of the post 57 is a cam structure more clearly shown in Fig. 8 as comprising end cams 66 and an intervening straight track section 67. These cams are so disposed that either of them may readily strike a projection 68 on the side of the door 48, and swing the door thereafter allowing the door to close behind the car as it passes therethrough.

Disposed along the opposite side of the hen house from the roosts are nest sections 69. These sections are more clearly shown in Figs. 5 and 6, while it will be seen that they are composed of supporting brackets 70, extending horizontally from the wall. Positioned upon these brackets are floor boards 71 and 72, the floor boards 72 are fitted with front hinge boards 73. The brackets 70 are spaced with such position above each other that the distances between the two floor boards 72 will be substantially equal to the width of the member 73, thus allowing the front of the nest compartments to be closed when boards 73 are folded upwardly. The lengths of the brackets 70 are such as to provide a space between adjacent boards 71 and 72, and into which a tongue board 74 may be positioned. This board is secured to a plurality of nest walls 75, which are spaced in relation to each other to form a series of nests. Reinforcing strips 76 are secured to the rear upper edges of these boards to further assist in holding them in position. As shown in Fig. 5, a run-way 77 will occur along the front floor boards 72 and between the upwardly folding boards 73, and the member 74. This run-way is accessible at the ends thereof, when member 78 is properly disposed relative thereto. This member comprises a vertical board 79 hinged along one edge to end boards 80, by means of the hinges 81. Extending horizontally from this board is a platform 82, and when the board 79 is swung around with its back to the end board 80 the platform 82 will project from the end of the nest compartment and provide an alighting platform for the hens passing to and from the nests. Attention is directed to the fact that light does not pass directly into the faces of the hens setting on the nests, but that they will instinctively turn facing the enclosed run-way 77. This will also place the hens facing the downwardly swinging member 73, so that setting hens may be readily approached, and removed without unnecessary excitement. The nests may be cleaned by removing the nest compartments 75, thereafter turning the boards 71 over.

It is common practice to remove setting hens from a nest and place them in a pen at some distance from the regular quarters, when large numbers of hens are taken care of this is quite a task, and for convenience, as well as really bettering the hens, a so called jail is disposed above the nest compartments, as indicated at 83. This jail is formed with a floor of slats 84, spaced some distance from each other, while the front is formed of slats 85, and the top of inclined slats 86. It is well known that a tendency of hens to set is accompanied by a fever which may be readily broken by exercise, and for that reason a well ventilated compartment is provided. Exercise is introduced due to the fact that the hen does not care to set on a slat floor and will try to escape between slats 85. The slats 85 are spaced a considerable distance from each other, but not quite far enough apart to permit the exit of the hen, who will make a continuous effort to work between the slats and escape. After several hours of such exercise all inclination to set will have been destroyed. The hens are placed into the compartment 83 through a door 87, and when it is desired to release the birds swinging doors 88 are let down, which members will serve as a run-way.

Experience has taught raisers of poultry that chickens quickly become associated with a certain poultry house, or roosting and nesting place, and when changed from house to house are easily excited and otherwise upset. By providing adjustable partitions 89 on the outside of the hen house it is possible to easily direct the chickens from one house to the other without commotion, and as the various compartments of the house are identical, beneficial results are insured. This adjustable partition construction of a fence encloses an outside run-way, one section of the fence being secured to fixed posts 90 and adapted to be swung to one side or the other, and to be secured to or between either side of the run-way doors 29'.

Figure 1:
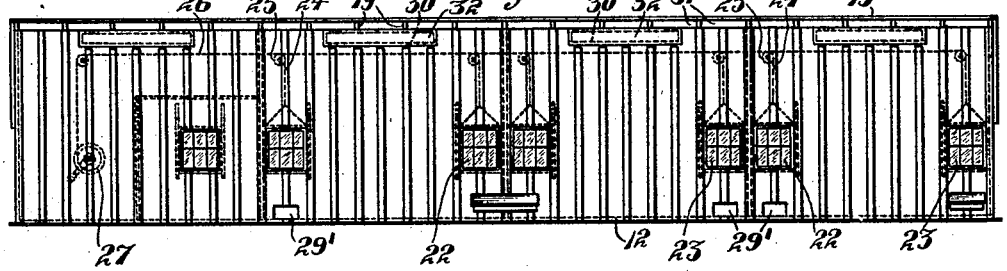
Fig. 1 is a view in front elevation, showing one side of the poultry house.
Figure 2:
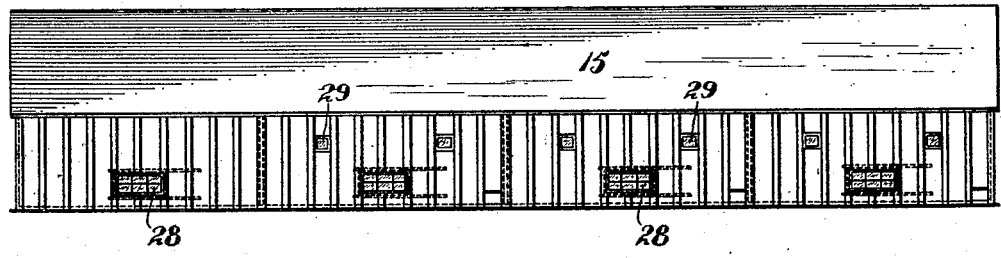
Fig. 2 is a view of the poultry house as seen in rear elevation.
Figure 3:
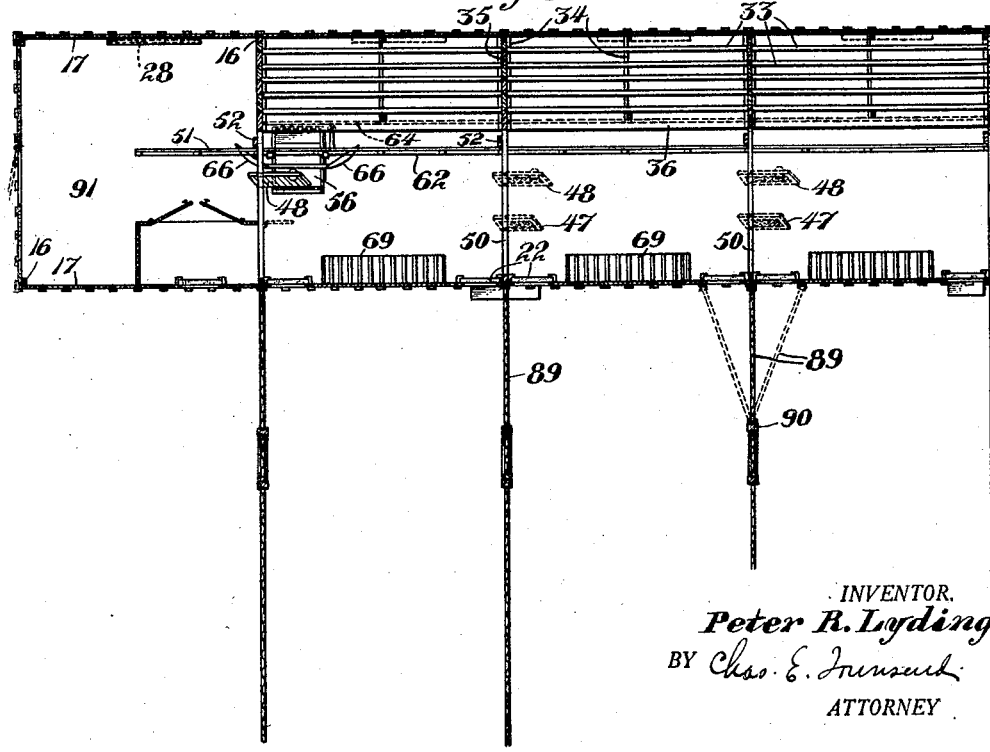
Fig. 3 is a view in plan and section showing the general arrangement of the roosts, nests and partitions.

Raising chickens in the poultry house described, tools and feed are kept in an end room 91, while the chickens are distributed as desired in the various compartments throughout the length of the house. Simultaneous movement of the windows 22 and 23 may be brought about to produce ventilation by rotation of the drums 27 in the feed house. When it is desired to feed the chickens the feed container may be positioned upon the car 56 and moved along the track 62. The cam member 66 will act to successively open the various doors 48, after which these doors will automatically close. In this manner it is possible for one attendant to rapidly pass the length of the house and feed the chickens in each of the compartments without commotion and without danger of the chickens passing from one compartment to the other, or into an intermediate run-way, now commonly employed. On the return trip the attendant may gather the eggs and place them on the car. When it is desired to clean the house carrier 65 may be placed upon the car 56, and the floor 36 readily scraped. At the same time nest compartments may be opened by swinging the member 73, and the jails cleaned by withdrawing boards 84'. The car may be easily dumped due to the fact that the platform 59 is secured to the post 57 by a hinge 91, yieldably held by member 92, after which the nest partitions 75 are removed and the floor board 71 turned over. In the event that one compartment of the poultry house is too small a removable partition may be knocked down and taken away to run two or more compartments together, as required. If chickens are to be transferred from one compartment to the other the movable fence section may be swung as indicated by dotted lines in Fig. 3.

It will thus be seen that by the provision of the poultry house here disclosed, it is possible to conveniently and scientifically accommodate and segregate any number of chickens, as well as care for them, at the same time insuring sanitary conditions, proper ventilation, and other living conditions which will make it possible to easily raise the chickens, and obtain a maximum yield of eggs therefrom.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is:

1. A poultry house having a longitudinal runway and provided with longitudinal roost bars located at one side of the runway, permanently mounted partitions extending across the roost bars from the runway to the adjacent side of the poultry house, removable partitions cooperating with the permanently mounted partitions and extending to the opposite side of the poultry house, and having automatically closing doors extending across the runway and adapted to be operated by a car, and a roost floor located beneath the roost bars and having a longitudinal car guide.

2. A poultry house having a longitudinal runway and provided with longitudinal roost bars located at one side of the runway, permanently mounted partitions extending across the roost bars from the runway to the adjacent side of the poultry house, removable partitions cooperating with the permently mounted partitions and extending to the opposite side of the poultry house and having automatically closing doors extending across the runway and adapted to be operated by a car. a roost floor located beneath the roost bars and having a longitudinal car guide, and a car hung from the top and having means at one side for engaging and opening the said doors and provided at the opposite side with means slidable along the car guide for holding the car against lateral movement.

3. A poultry house having a longitudinal runway and provided with longitudinal roost bars located at one side of the runway, permanently mounted partitions extending across the roost bars from the runway to the adjacent side of the poultry house, removable partitions cooperating with the permanently mounted partitions and extending to the opposite side of the poultry house and having automatically closing doors extending across the runway and adapted to be operated by a car, a roost floor located beneath the roost bars and having a longitudinal car guide, and a car hung from the top and having means at one side for engaging and opening the said doors and provided at the opposite side with an arm having a roller slidable along the longitudinal guide for holding the car against lateral movement.

4. A poultry house having a longitudinal runway and provided with roost bars located at one side of the runway, permanently mounted partitions located at one side of the runway and extending across the roost bars to the adjacent side of the poultry house, removable partitions cooperating with the permanently mounted partitions and extending to the opposite side of the poultry house and provided with automatically closing doors extending across the runway, a roost floor located beneath the roost bars and provided at its under side with a longitudinal guide bar spaced from the front edge of the roost floor, and a hanging car movable along the runway and provided at one side with means for opening the said doors and having an arm extending from the opposite side of the car beneath the roost floor and slidable along the guide bar thereof for holding the car against lateral movement.

5. A poultry house having a longitudinal runway and provided with roost bars located at one side of the runway, permanently mounted partitions located at one side of the runway and extending across the roost bars to the adjacent side of the poultry house, removable partitions cooperating with the permanently mounted partitions and extending to the opposite side of the poultry house and provided with automatically closing doors extending across the runway, longitudinal guiding means located at one side of the runway and a car having a vertical member hung from the upper end and provided at one side with a cam arranged diagonally to engage and open the automatic doors, and means located at the opposite side and movable along the said guiding means for holding the car against lateral movement.

6. A poultry house having a longitudinal runway and provided with roost bars located at one side of the runway, permanently mounted partitions located at one side of the runway and extending across the roost bars to the adjacent side of the poultry house, removable partitions cooperating with the permanently mounted partitions and extending to the opposite side of the poultry house, and provided with automatically closing doors extending across the runway, longitudinal guiding means located at one side of the runway and a car having a vertical member hung from the upper end, an intermediate track bar located at one side of the vertical bar, end cams arranged at the terminals of the intermediate bar and arranged to open the automatic doors, and means located at the opposite side of the vertical member and slidable along the longitudinal guiding means for holding the car against lateral movement.

7. A poultry house having a longitudinal runway and provided with roost bars located at one side of the runway, permanently mounted partitions located at one side of the runway and extending across the roost bars to the adjacent side of the poultry house, removable partitions cooperating with the permanently mounted partitions and extending to the opposite side of the poultry house and provided with automatically closing doors extending across the runway, longitudinal guiding means located at one side of the runway and a car having a vertical member hung from the upper end, an intermediate track bar located at one side of the vertical bar, end cams arranged at the terminals of the intermediate bar, and arranged to open the automatic doors, and an arm extending from the opposite side of the vertical bar and provided with a roller slidable along the longitudinal guiding means for holding the car against lateral movement.

8. A poultry house having a runway, a roost floor located at one side of the runway and having a longitudinal guide, a hanging car movable along the runway and having a hinged platform arranged to dump away from the roost floor, and means carried by the car and slidable along the longitudinal guide to prevent lateral movement of the car.

9. A poultry house having a runway, a roost floor located at one side of the runway and having a longitudinal guide, a hanging car movable along the runway and having a hinged platform arranged to dump away from the roost floor, means carried by the car and slidable along the longitudinal guide to prevent lateral movement of the car, and combined arcuate guiding and bracing means connected with the platform.

PETER R. LYDING.